(12) United States Patent
Shimada et al.

(10) Patent No.: US 9,773,425 B2
(45) Date of Patent: Sep. 26, 2017

(54) CHOICE QUESTION CREATING APPARATUS

(71) Applicant: KYOCERA Document Solutions Inc., Osaka (JP)

(72) Inventors: Akira Shimada, Osaka (JP); Takayuki Mashimo, Osaka (JP); Toshihiko Tanaka, Osaka (JP); Takashi Harada, Osaka (JP); Nobuto Fujita, Osaka (JP); Masaaki Nishihara, Osaka (JP); Hikaru Miyaji, Osaka (JP); Yukio Shibata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/283,153

(22) Filed: Sep. 30, 2016

(65) Prior Publication Data

US 2017/0092146 A1 Mar. 30, 2017

(30) Foreign Application Priority Data

Sep. 30, 2015 (JP) .................................. 2015-194094

(51) Int. Cl.
*G09B 7/04* (2006.01)
*H04N 1/40* (2006.01)
(Continued)

(52) U.S. Cl.
CPC ......... *G09B 7/04* (2013.01); *G06F 17/30253* (2013.01); *G06F 17/30705* (2013.01);
(Continued)

(58) Field of Classification Search
CPC G09B 7/04; G06F 17/30253; G06K 9/00442; G06K 9/4604; G06K 2209/01; H04N 1/00795; H04N 2201/0094
See application file for complete search history.

(56) References Cited

U.S. PATENT DOCUMENTS

| 5,960,419 A * | 9/1999 | Fagg, III ................ G06N 5/025 706/59 |
| 2008/0145832 A1* | 6/2008 | Lee .......................... G09B 7/00 434/362 |

FOREIGN PATENT DOCUMENTS

JP 2007-004523 A 1/2007

* cited by examiner

*Primary Examiner* — Quang N Vo
(74) *Attorney, Agent, or Firm* — Hawaii Patent Services; Nathaniel K. Fedde; Kenton N. Fedde (57) ABSTRACT

Provided is a choice question creating apparatus creating a choice question on a question document.
It includes an image reading part reading a question document to acquire image data; a character recognizing part executing recognition on image data, acquiring document text data; a sentence extraction part extracting from document text data; a correct answer identifying part identifying word as correct answer from sentence; a word dictionary database in which words are classified into categories and registered; a choice creating part selecting specific number of words from category in word dictionary database including correct answer, and arranges words selected, and word as correct answer identified by correct answer identifying part to create choice group; a question sentence transforming part deleting correct answer from sentence to transform it into question sentence, and a layout part arranging transformed question sentence, and created choice group to create a choice question.

5 Claims, 6 Drawing Sheets

(51) Int. Cl.
*H04N 1/00* (2006.01)
*G06F 17/30* (2006.01)
*G06K 9/00* (2006.01)
*G06K 9/46* (2006.01)

(52) U.S. Cl.
CPC ....... *G06K 9/00442* (2013.01); *G06K 9/4604* (2013.01); *H04N 1/00795* (2013.01); *G06K 2209/01* (2013.01); *H04N 2201/0094* (2013.01)

| Word | Related terms |
|---|---|
| Potato | Hokkaido, Tokachi area, starch, ...... |
| Sweet potato | Kagoshima, volcanic ash, Tanegashima, ...... |
| ... | ... |

CHOICE QUESTION CREATING APPARATUS

INCORPORATION BY REFERENCE

This application is based on and claims the benefit of priority from Japanese Patent Application No. 2015-194094 filed on Sep. 30, 2015, the contents of which are hereby incorporated by reference.

BACKGROUND

The present disclosure relates to a choice question creating apparatus that extracts a piece of information from the image data for a teaching material for learning, such as a textbook, and creates a question on the basis of the piece of information that has been extracted.

On the site of learning in schools, and the like, workbooks or collections of questions that have been published by teaching material publishing companies, or the like, as supplementary teaching materials, however, some collections of questions that have been adopted do not correspond to the contents of a textbook. Then, there has been proposed a technique with which a question can be simply generated from a teaching material for learning, such as a textbook. For example, as the typical technique, there has been proposed a technique that reads an image of a question document on which a character string that would be the correct answer for a question is marked, and generates electronic data for a collection of correct answers that have been created by using the character strings marked, and electronic data for question sentences in which the character strings marked are deleted.

SUMMARY

A choice question creating apparatus of the present disclosure includes an image reading part that reads a question document to acquire image data; a character recognizing part that executes character recognition processing on the image data to acquire text data of the question document; a sentence extraction part that extracts a sentence from the text data of the question document; a correct answer identifying part that identifies a word as the correct answer from the sentence; a word dictionary database in which a plurality of words are classified into a plurality of categories and registered; a choice creating part that selects a specific number of the words from the category in the word dictionary database that includes the correct answer, and arranges the specific number of the words that have been selected, and the word as the correct answer that has been identified by the correct answer identifying part to create a choice group; a question sentence transforming part that deletes the correct answer from the sentence to transform it into a question sentence; and a layout part that arranges the question sentence that has been transformed by the question sentence transforming part, and the choice group that has been created by the choice creating part to create a choice question.

DETAILED DESCRIPTION

Hereinbelow, an embodiment of the present disclosure will be explained in detail with reference to the drawings. In the following embodiment, the structure that gives the same function is provided with the same reference sign.

Figure 1:
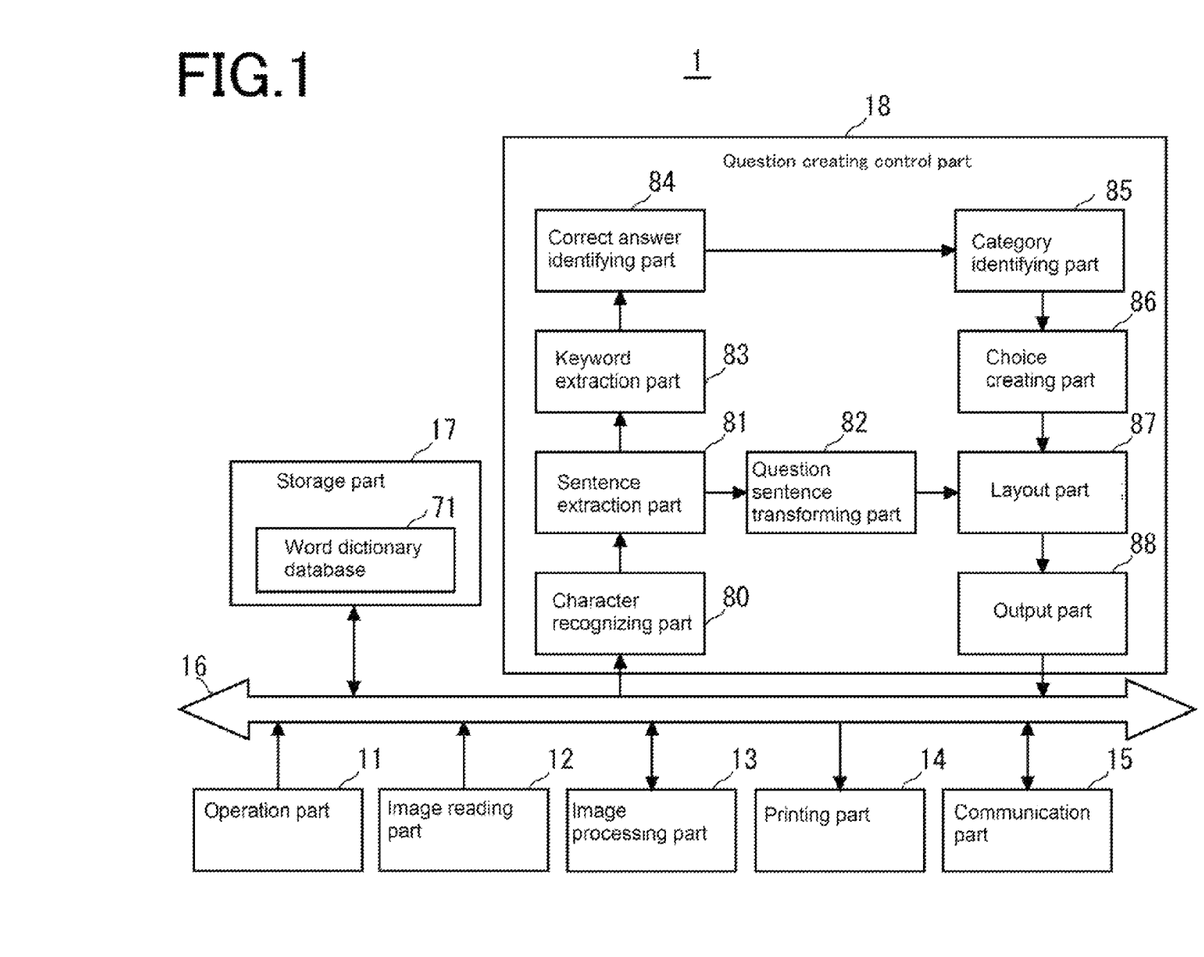
FIG. 1 is a functional block diagram illustrating the configuration of a choice question creating apparatus of an embodiment according to the present disclosure.

An image forming apparatus 1 of the embodiment of the present disclosure is a Multifunctional Peripheral (MFP), functioning as a choice question creating apparatus. With the image forming apparatus 1, an operation part 11, an image reading part 12, an image processing part 13, a printing part 14, a communication part 15, a storage part 17, and a question creating control part 18 are connected to a system bus 16.

The operation part 11 is provided with a liquid crystal display part and operation buttons. A question setting person, such as a teacher, operates the operation part 11 to input instructions, thereby making various settings for the image forming apparatus 1, and causing various functions, such as image formation, to be executed. The liquid crystal display part indicates the status of the image forming apparatus 1; displays the situation of image formation and the number of printing copies; and as a touch panel, receives various settings, such as duplex printing, white/black reversal, and other settings for function, magnification setting, and printing density setting. As the operation buttons, there are provided a start button with which the question setting person instructs starting of image formation, a stop/clear button that is used in such a case as that where image formation is to be interrupted, a reset button that is used when the various settings for the image forming apparatus 1 are to be defaulted, ten keys, and the like.

The image reading part 12 is a scanning device that reads a question document on which a character string to be set as a question is given, and acquires image data. The question document may be, for example, a copy of a textbook, or the like.

The image processing part 13 is a means for performing a specific image processing on the image data, for example, performing enlargement/reduction processing, or image improvement processing, such as density adjustment or gradation adjustment.

The printing part 14 is a printing means for printing a choice question page that has been created by the question creating control part 18 on a recording paper. The printing part 14 forms a latent image on the surface of a photosensitive drum on the basis of the image data for the choice question page, performing image formation that uses toner to make the latent image to be a toner image, transferring the toner image from the photosensitive drum to the recording paper, fixing that toner image on the recording paper, and discharging the recording paper.

The communication part 15 has a function for transmitting/receiving various data to/from an external terminal through a network, such as an LAN (Local Area Network).

The storage part 17 is a storing means, such as a semiconductor memory, or an HDD (Hard Disk Drive). In addition, the storage part 17 stores a word dictionary database 71 in which a plurality of words (nouns) are registered, being classified into a plurality of categories. The question setting person prepares a word dictionary database 71 by previously compiling the words into a database by question setting categories on the basis of a textbook, a reference book, or the like.

Figure 2:
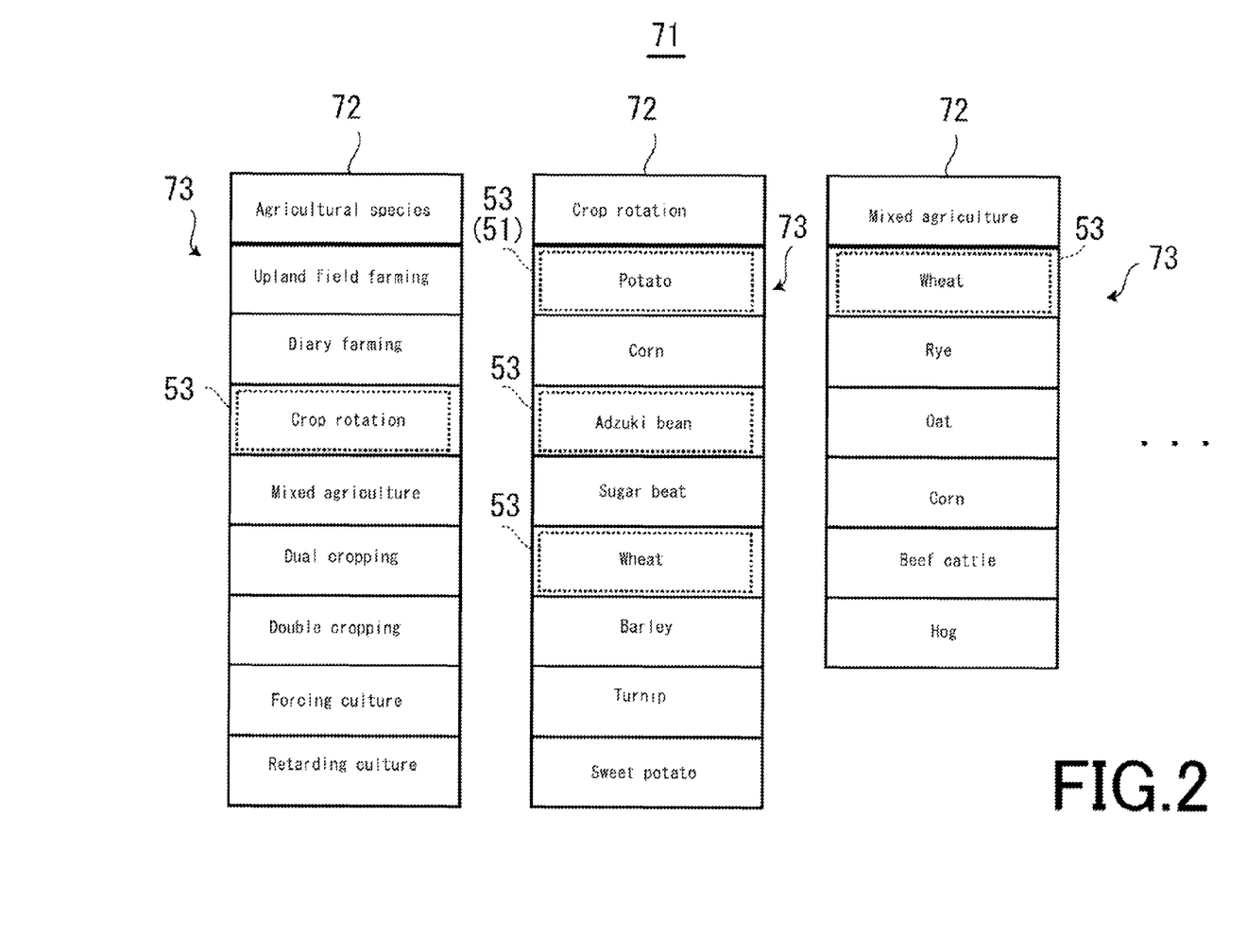
FIG. 2 gives a specific example of a word dictionary database shown in FIG. 1 that is registered.

FIG. 2 gives a specific example of the word dictionary database 71 that is registered. In the word dictionary database 71, as categories 72 of words that are to be set as questions, "agricultural species", "crop rotation", "mixed agriculture", and the like, are registered. In addition, in the "agricultural species" category 72, words 73 of "upland field farming", "diary farming", "crop rotation", "mixed agriculture", and the like, are registered, and in the "crop rotation" category 72, words 73 of "potato", "corn", "adzuki bean", "sugar beat", "wheat", "barley", and the like, are registered. In addition, in the "mixed agriculture" category 72, words 73 of "wheat", "rye", "oat", "corn", and the like, are registered. In the word dictionary database 71, besides these, a plurality of words 73 are registered, being classified into a plurality of categories 72.

The question creating control part 18 is an information processing part, such as a microcomputer, that is equipped with an ROM (Read Only Memory), an RAM (Random Access Memory), and the like. In the ROM, a control program for performing operation control of the image forming apparatus 1 is stored. The question creating control part 18 reads the control program that is stored in the ROM, and expands the control program in the RAM, thereby executing a question creating operation in accordance with a specific piece of instruction information that has been inputted from the operation part 11.

The question creating control part 18 functions as a character recognizing part 80, a sentence extraction part 81, a question sentence transforming part 82, a keyword extraction part 83, a correct answer identifying part 84, a category identifying part 85, a choice creating part 86, a layout part 87, and an output part 88.

The character recognizing part 80 has a function to execute OCR (Optical Character Reader) processing on the image data for the question document that has been read by the image reading part 12 for acquiring text data of the question document.

The sentence extraction part 81 has a function to extract a sentence including a character string marked with a highlighter pen, or the like, from the text data of the question document. The extracted sentence is used as a question sentence.

The keyword extraction part 83 has a function to morphologically analyze the sentence that has been extracted by the sentence extraction part 81 for extracting words (nouns) in the sentence as a keyword, respectively. All the words (nouns) in the sentence could be a keyword, respectively.

The correct answer identifying part 84 identifies the character string marked on the question document as the correct answer among the plurality of keywords that have been extracted by the keyword extraction part 83.

The category identifying part 85 searches the word dictionary database 71 to identify the category 72 in which the keyword that has been extracted by the keyword extraction part 83 is included most among the categories 72 in which at least the keyword of the correct answer is included.

The choice creating part 86 selects a specific number of words 73 other than the keyword (for example, three for a four-choice question, i.e., a number that is given by subtracting one from the number of choices, the one being the number of the correct answer) for use as choices from the words that are classified into the category 72 that has been identified by the category identifying part 85. Then, the choice creating part 86 arranges the plurality of words 73 that have been selected, and the correct answer that has been acquired by the correct answer identifying part 84 at random, allocating an answer number in turn from the head, respectively to create a choice group.

The question sentence transforming part 82 has a function to delete the correct answer from the sentence, and insert a question number into the place where the correct answer has been deleted, transforming the sentence into a question sentence. The question number is uniquely allocated for each question sentence.

The layout part 87 has a function to arrange the question sentence that has been transformed by the question sentence transforming part 82, and the choice group that has been created by the choice creating part 86 to create a choice question page.

The output part 88 has a function to output the choice question page that has been created by the layout part 87.

Figure 3:
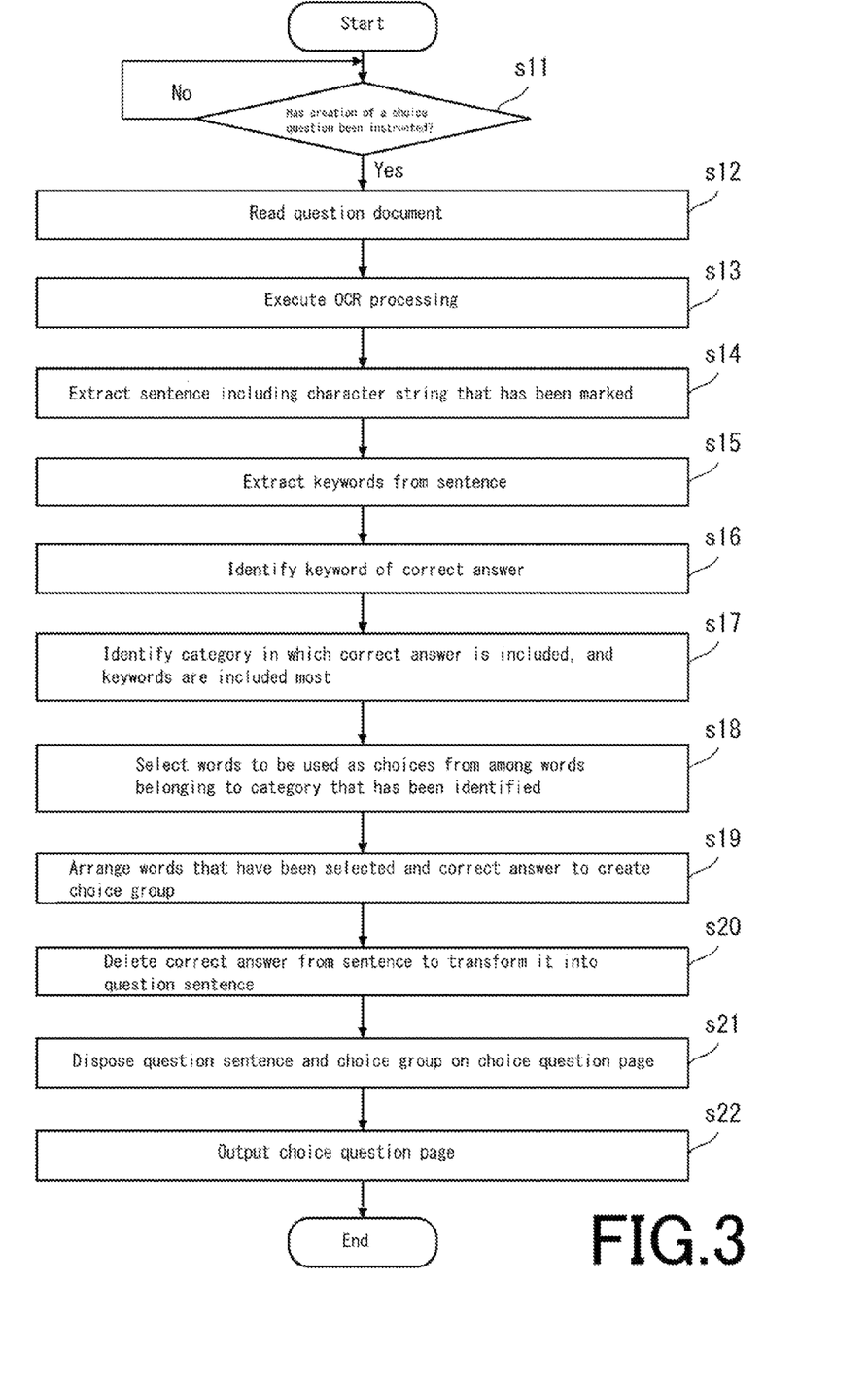
FIG. 3 is a flowchart illustrating the flow of the choice question creating process of the choice question creating apparatus shown in FIG. 1.

Next, with reference to FIG. 3, the flow of the choice question creating processing will be explained.

Figure 4:
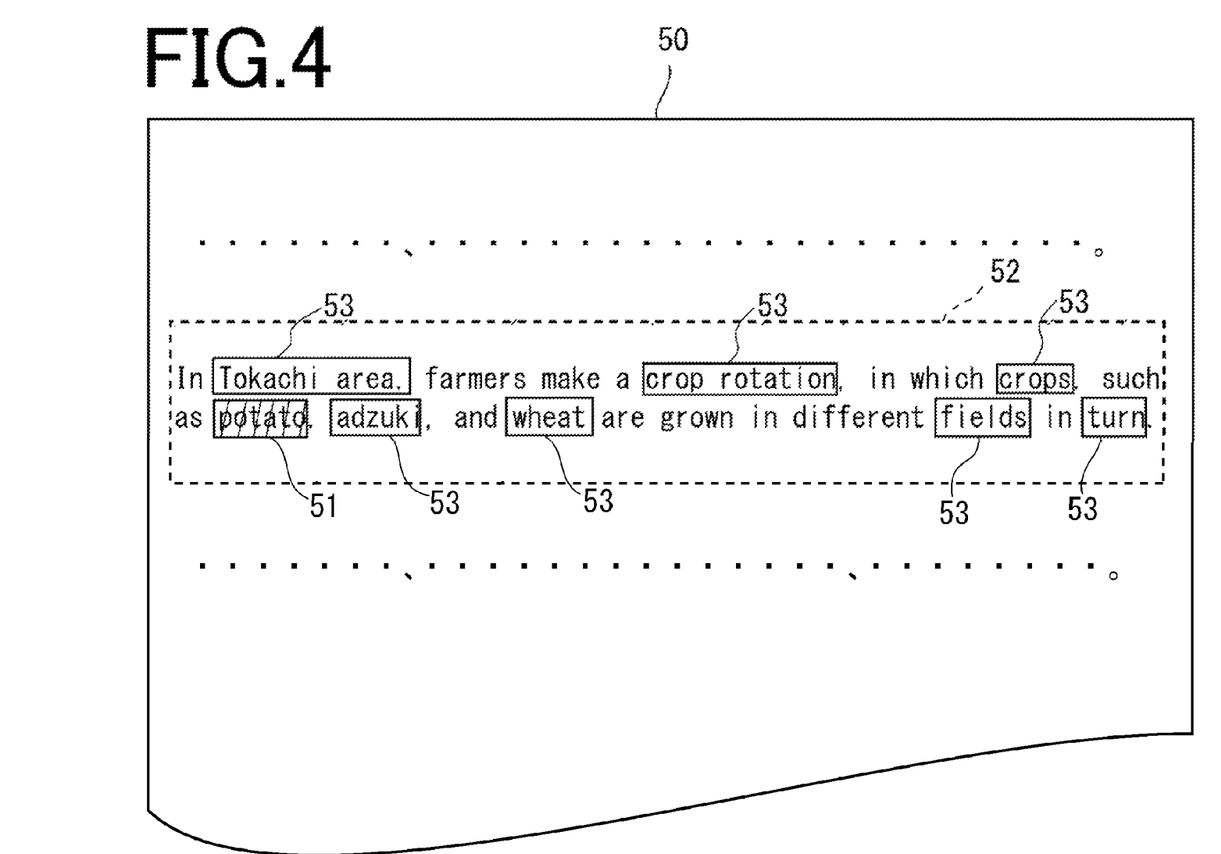
FIG. 4 gives one example of a question document that is to be read by an image reading part shown in FIG. 1.

First, the question setting person uses a marker to mark a character string on the question document that is to be the correct answer for a question. The question setting person can specify the place to be set as a question simply by marking it. FIG. 4 gives one example of a question document 50. On this question document 50, a marked character string 51 is "potato". The question setting person sets the marked question document 50 in the image reading part 12, and instructs creation of a choice question through the operation part.

The question creating control part 18 waits until creation of a choice question is instructed (Step S11, NO at Step S11), and when creation of a choice question is instructed (YES at Step S11), the question creating control part 18 reads the question document 50 through the image reading part 12 (Step S12), acquiring the image data for the question document 50. Then, the character recognizing part 80 executes OCR processing on the image data that has been acquired by the image reading part 12 (Step S13) to acquire text data of the question document 50.

Then, the sentence extraction part 81 extracts a sentence 52 including the character string 51 that has been marked from the text data of the question document 50 (Step S14).

Then, the keyword extraction part 83 morphologically analyzes the sentence 52 that has been extracted by the sentence extraction part 81 for extracting all the words (nouns) included in the sentence 52 as a keyword 53, respectively (Step S15).

Then, the correct answer identifying part 84 acquires the character string 51 that has been marked on the question document 50 as the correct answer among the keywords 53 that have been extracted by the keyword extraction part 83 (Step S16).

Then, the category identifying part 85 searches the word dictionary database 71 to identify the category 72 in which the plurality of keywords 53 that have been extracted by the keyword extraction part 83 are included most among the categories 72 in which the correct answer is included (Step S17).

For example, with the word dictionary database 71 shown in FIG. 2, "potato", the correct answer (which is the marked character string 51) is included in the "crop rotation" category 72. In addition, in the "agricultural species" category 72, one keyword 53 is included; in the "crop rotation" category 72, three keywords 53 are included; and in the "mixed agriculture" category 72, one keyword 53 is included. In this case, the category identifying part 85 identifies the "crop rotation" category 72 as the category 72 in which the correct answer is included and the most keywords 53 are included.

In the case where there are a plurality of categories 72 that include the keyword 53 most, the category identifying part 85 may cause the question setting person to specify which one of the plurality of categories 72 is to be used. In addition, in the case where there is only one category 72 in which the correct answer is included, the category 72 that includes the correct answer is identified by the category identifying part 85 regardless of the number of keywords 53. For example, in the case where the correct answer is "crop rotation", the "agricultural species" category 72 is identified. In the case where the category 72 in which the correct answer is included has not been found in the word dictionary database 71, the category identifying part 85 may notify an error, causing the question setting person to stop the question setting.

Then, the choice creating part 86 selects a specific number of words 73 other than the keywords 53 that are to be used as choices from among the words 73 belonging to the category 72 that has been identified by the category identifying part 85 (Step S18). For example, with the "crop rotation" category 72, as the words 73 other than the keywords 53, a specific number of words 73 are selected from among "corn", "sugar beat", "barley", "turnip", and "sweet potato".

Then, the choice creating part 86 arranges the plurality of words 73 that have been selected, and the correct answer that has been acquired by the correct answer identifying part 84 at random, allocating an answer number in turn from the head, respectively, and placing a question number before the first answer number to create a choice group (Step S19). Any answer number may be given if it is unique in the choice group for one question, and any question number may be given if it is unique in all the questions.

Then, the question sentence transforming part 82 deletes the correct answer (which is the marked character string 51) from the sentence 52 that has been extracted by the sentence extraction part 81, and inserts a question number corresponding to the choice group into the place where the correct answer has been deleted, transforming the sentence 52 into a question sentence (Step S20).

Then, the layout part 87 creates a choice question page on which the question sentence that has been transformed by the question sentence transforming part 82, and the choice group that has been created by the choice creating part 86 are disposed (Step S21).

Figure 5:
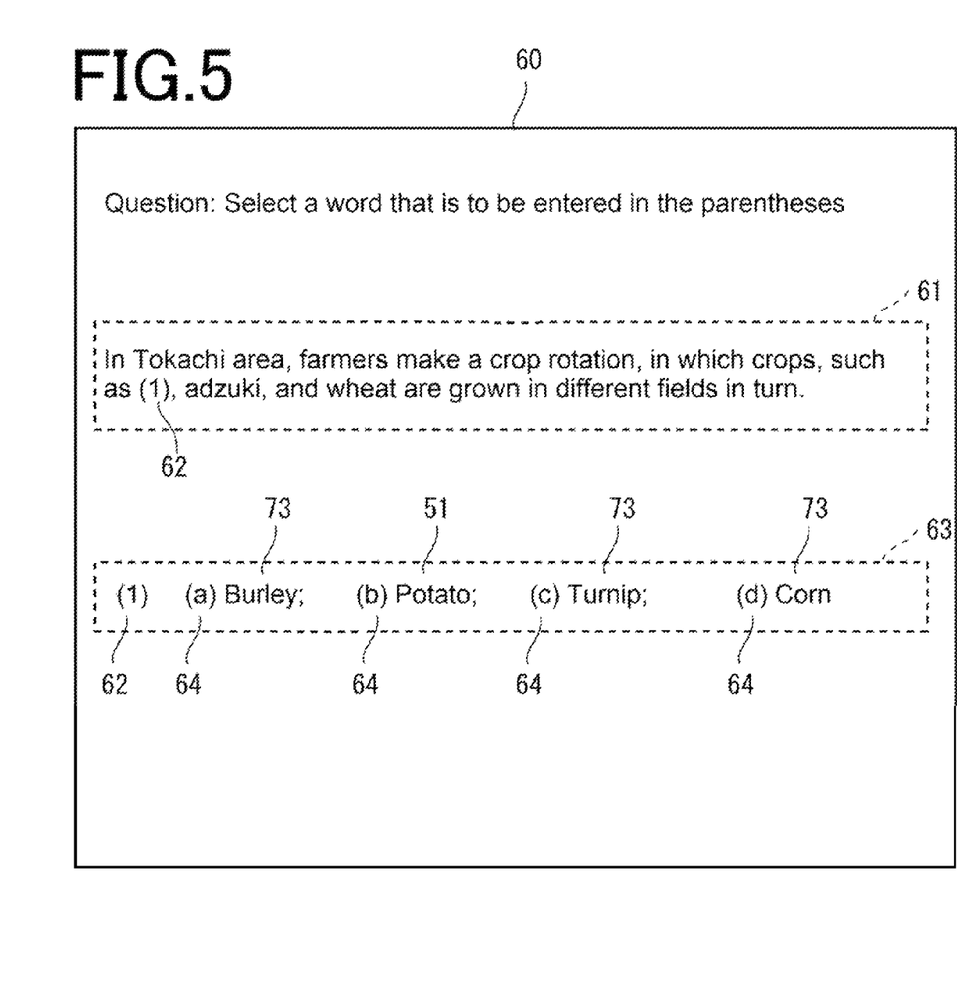
FIG. 5 gives one example of a choice question page that is to be created by the question creating control part shown in FIG. 1.

For example, FIG. 5 gives one example of a choice question page 60. On the choice question page 60, the question sentence 61 that has been transformed by the question sentence transforming part 82, and the choice group 63 that has been created by the choice creating part 86 are disposed. In the question sentence 61, the question number 62 is given in the place where the correct answer in the sentence 52 has been deleted. In addition, before the head of the choice group 63, the question number 62 corresponding to the question sentence 61 is placed, and to the respective choices, an answer alphabetical letter symbol 64 is allocated in turn from the head. The choices are comprised of words 73 other than the keywords 53 that have been extracted by the keyword extraction part 83 in the category 72 that has been identified by the category identifying part 85, and the correct answer (which is the marked character string 51) that has been deleted from the sentence 52.

Then, the output part 88 outputs the choice question page 60 that has been created by the layout part 87 (Step S22), terminating the present process. The output part 88 may output the choice question page 60 by printing it through the printing part 14, by displaying it on the liquid crystal display part, or by transmitting it to a terminal that has been specified by the question setting person.

Thus, the image forming apparatus 1 of the present embodiment includes an image reading part 12 that reads a question document 50 to acquire image data; a character recognizing part 80 that executes character recognition processing on the image data to acquire text data of the question document 50; a sentence extraction part 81 that extracts a sentence 52 from the text data of the question document 50; a correct answer identifying part 84 that identifies a word as the correct answer from the sentence 52; a word dictionary database 71 in which a plurality of words 73 are classified into a plurality of categories 72 and registered; a choice creating part 86 that selects a specific number of words 73 from the category 72 in the word dictionary database 71 that includes the correct answer, and arranges the specific number of words 73 that have been selected, and the word as the correct answer that has been identified by the correct answer identifying part 84 to create a choice group 63; a question sentence transforming part 82 that deletes the correct answer from the sentence 52 to transform it into a question sentence 61; and a layout part 87 that arranges the question sentence 61 that has been transformed by the question sentence transforming part 82, and the choice group 63 that has been created by the choice creating part 86 to create a choice question. According to the present embodiment, a choice question can be automatically created on the basis of the question document 50.

With the typical technique, there has been a problem that, on the basis of a question document, it cannot create a plurality of choices including a character string that has been marked, and create a choice question that causes the correct answer to be selected from the choices.

According to the present disclosure, a technique can be provided that, on the basis of a question document, a choice question can be created.

In the above-described embodiment, the correct answer identifying part 84 has identified the character string 51 that has been marked by the question setting person as the correct answer, however, the correct answer identifying part 84 may be adapted such that, in the event that the question document 50 has no character string 51 that has been marked, any one of the keywords 53 that have been extracted by the keyword extraction part 83 (for example, one that has been selected at random from the keywords 53) is identified as the correct answer. According to this scheme, the question creating control part 18 can create a choice question with no need for marking.

In addition, the choice creating part 86 selects a specific number of words 73 other than the keywords 53 from the category 72 that has been identified by the category identifying part 85 as choices, however, there is the possibility that the correct answer maybe mixed in the specific number of words 73 that have been selected as the choices. Then, it is recommended that a related term dictionary database 75 in which, for the respective words 73 that are registered in the word dictionary database 71, related terms are previously registered be stored in the storage part 17.

Figure 6:
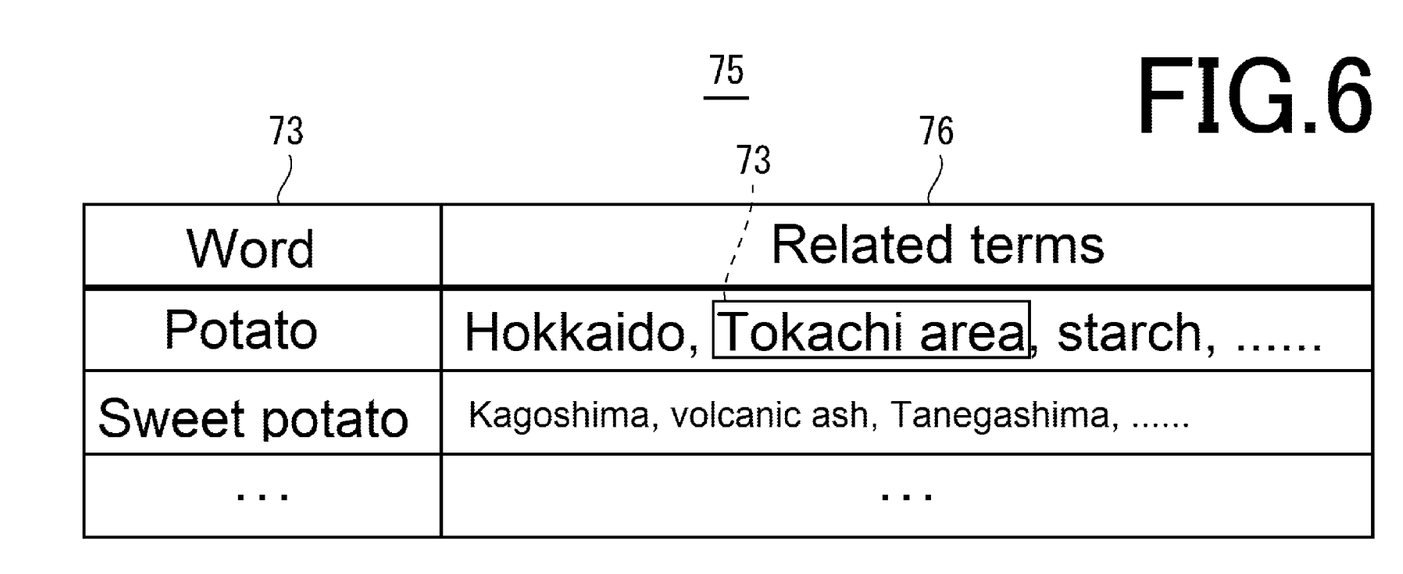
FIG. 6 gives one example of a related term dictionary database that is to be stored in a storage part shown in FIG. 1.

For example, FIG. 6 gives a specific example of the related term dictionary database 75 that is registered. As shown in the figure, in the related term dictionary database 75, the words 73 that are registered in the word dictionary database 71 and the related terms 76 for those words 73 are registered, being associated with one another. When the choice creating part 86 selects a word 73 as a choice from the category 72 that has been identified by the category identifying part 85, the choice creating part 86 references the related term dictionary database 75 to select a word 73 for which no keyword 53 is included in the related terms 76. For example, assuming that, in the related term dictionary database 75, no keyword 53 is included in the related terms 76 for "sweet potato", the choice creating part 86 may select "sweet potato" as one of the choices. According to this scheme, the choice creating part 86 adopts a word 73 that is not related to the keyword 53 as a choice, whereby the choice creating part 86 can select a choice of a wrong answer. Therefore, the choice creating part 86 can create a choice group 63 that has only one correct answer for the question to thereby create an alternative question.

The present disclosure is not limited to the above-described embodiment, and of course can be altered in various ways within the scope of the gist of the present disclosure.

What is claimed is:

1. A choice question creating apparatus, comprising:
an image reading part that reads a question document to acquire image data,
a character recognizing part that executes character recognition processing on the image data to acquire text data of the question document,
a sentence extraction part that extracts a sentence from the text data of the question document,
a correct answer identifying part that identifies a word as the correct answer from the sentence,
a word dictionary database in which a plurality of words are classified into a plurality of categories and registered,
a choice creating part that selects a specific number of the words from the category in the word dictionary database that includes the correct answer, and arranges the specific number of the words that have been selected, and the word as the correct answer that has been identified by the correct answer identifying part to create a choice group,
a question sentence transforming part that deletes the correct answer from the sentence to transform it into a question sentence, and
a layout part that arranges the question sentence that has been transformed by the question sentence transforming part, and the choice group that has been created by the choice creating part to create a choice question.

2. The choice question creating apparatus according to claim 1, comprising:
a keyword extraction part that extracts a plurality of words included in the sentence as a keyword, respectively, and
a category identifying part that searches the word dictionary database to identify the category in which the keywords that have been extracted by the keyword extraction part are included most in the categories in which at least the correct answer is included,
wherein the choice creating part
selects the specific number of the words other than the plurality of keywords from the category that has been identified by the category identifying part.

3. The choice question creating apparatus according to claim 1, wherein, in the case where there is a word that has been marked in the question document,
the correct answer identifying part
identifies the word that has been marked in the question document as the correct answer.

4. The choice question creating apparatus according to claim 2, wherein, in the case where there is no word that has been marked in the question document,
the correct answer identifying part
identifies any one of the plurality of keywords that have been extracted by the keyword extraction part as the correct answer.

5. The choice question creating apparatus according to claim 2, comprising a related term dictionary database in which related terms for the words that are registered in the word dictionary database are registered,
wherein the choice creating part
references the related term dictionary database to select the word for which the keywords that have been extracted by the keyword extraction part are not included in the related terms as a wrong answer among the words that are included in the category identified by the category identifying part.

* * * * *